United States Patent Office 2,979,603
Patented Apr. 11, 1961

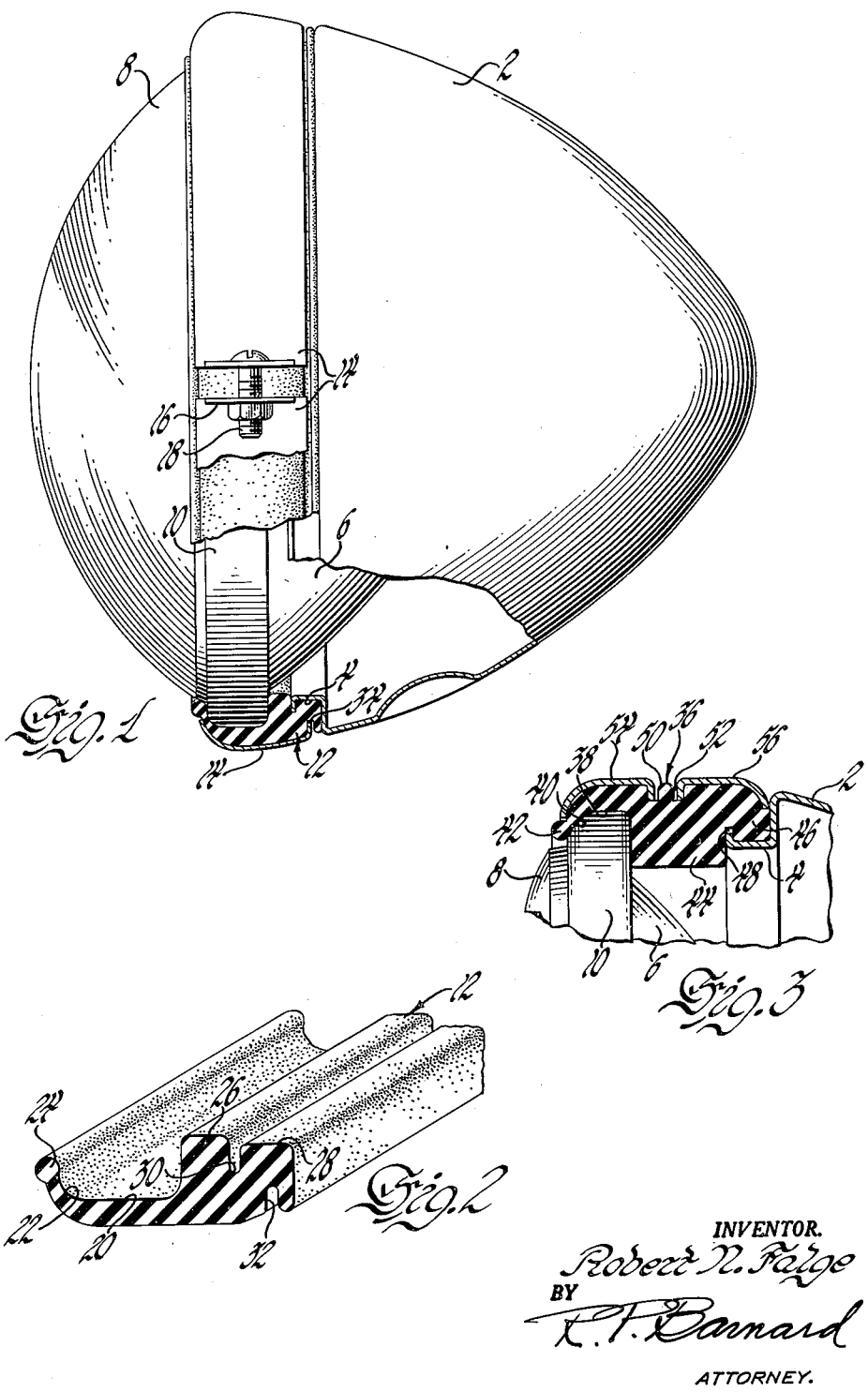

2,979,603

SHOCK ABSORBING LAMP MOUNTING

Robert N. Falge, Anderson, Ind., assignor to General Motors Corporation, Detroit, Mich., a corporation of Delaware Filed Feb. 25, 1957, Ser. No. 641,895

4 Claims. (Cl. 240—41.5)

The present invention relates to a mounting for an illuminating lamp relative to its housing to absorb shock.

In the past, several suggestions have been made as to means for resiliently mounting a vehicle lamp assembly to absorb shocks. Primarily, such suggestions have been devoted to spring mountings between a vehicle lamp housing and a vehicle fender to absorb these shocks. It is now proposed to so mount a lamp assembly as to completely isolate the lamp body itself from shocks. Within the purview of this invention, a lamp body such as a sealed beam unit may be resiliently supported relative to a lamp housing which, in turn, may be fixedly supported on a vehicle.

The present invention contemplates a shock absorbing mounting comprising an annular resilient gasket adapted for clamping engagement to axially spaced mounting seats carried, respectively, by a lamp housing and the body of the lamp or sealed beam unit, which gasket completely and resiliently isolates the lamp body or sealed beam unit from the lamp housing and the connection of the latter to the vehicle. Moreover, the shock absorbing mounting gasket also functions as a seal between the lamp body and its housing.

One form of the present invention employs an annular gasket having a suitable internal configuration for cooperation with the aforedescribed mounting seats carried, respectively, by the lamp housing and lamp body, and a single door or clamping ring for maintaining firm engagement between the gasket and seats to resiliently suspend the body within and from the open end of the lamp housing.

In another form of the invention, the annular gasket extends between spaced mounting seats carried, respectively, by the lamp housing and body as in the aforedescribed embodiment, and two doors or clamping rings are employed. One of these doors is associated with one mounting seat and the gasket while the other is associated with the other seat and the gasket in a manner whereby the clamping pressure exerted between the gasket and the respective seats may be selectively controlled by the individual doors, there being a portion of the gasket intermediate its axial length between the seats which will insure a resilient mounting irrespective of how tightly the doors are clamped about the gasket and seats.

Two preferred embodiments of this invention are shown in the drawings in which:

Figure 1 is a vertical side elevation, partly broken away, of a vehicle head lamp utilizing one form of the shock absorbing mounting of this invention;

Figure 2 is an enlarged perspective view of the shock absorbing gasket shown in Figure 1;

Figure 3 is a fragmentary view of another form of the mounting of this invention.

Referring now to Figure 1, there is disclosed a substantially conical or bullet-shaped lamp housing or support 2 having at its forward open end an edge bent inwardly, forwardly and outwardly to form a substantially channel or U-shaped outwardly opening annular mounting seat 4. A lamp body or sealed beam unit 6 having a lens 8 and radially projecting annular flange 10 of substantial axial width is demountably supported and suspended from the open end of the housing by means of a resilient annular gasket 12 clamped between the mounting flange 10 and channel shaped seat 4 by the door or clamping ring 14. The clamping ring may be suitably provided with a pair of outstanding ears 16 through which suitable means 18 may pass to securely clamp the door about the external surface of the gasket.

Referring now to Figure 2 and the configuration of the resilient shock absorbing gasket, it may be seen that this gasket comprises an annular seat 20 on its inner surface between an upwardly and outwardly swept annular lip 22 terminating in an annular bead 24, and a radially inwardly directed thick annular projection 26 axially spaced from a second projection 28 by a slot 30. On its external surface and intermediate the axial width of the projection 28, the resilient gasket is provided with another annular slot 32.

In mounting the sealed beam unit or lamp body within the housing, the annular gasket extends between the axially spaced channel shaped mounting seat 4 and radially projecting mounting flange 10, the flange being seated within the seat 20 and the projection 28 within and filling the channel shaped mounting seat. The projection 26 extends between and isolates the outwardly projecting leg of the channel shaped mounting seat and the rearwardly facing wall of the radially projecting flange 10, while the lip 22 and bead 24 carried thereby are lapped about the forward face of this flange. The clamping ring has a rear edge 34 radially inwardly turned and seated within the external slot 32 of the resilient gasket, while the forwardly extending edge of the ring curves arcuately inwardly against the lip 22 of the gasket and terminates beneath the annular bead 24. Upon tightening of the clamping ring or door, the resilient gasket is firmly seated between the axially spaced mounting flange 10 and channel shaped seat 4 to suspend the lamp body resiliently from the housing or support 2.

Referring now to Figure 3, there is shown a partly broken away section of another form of resilient mounting to be employed with a lamp body and lamp housing as disclosed in Figure 1. As before, the lamp housing 2 is provided at its forward end with an edge bent inwardly, forwardly and outwardly to form a substantially channel or U-shaped outwardly opening annular mounting seat 4. Similarly, the lamp body has a radially outwardly projecting annular flange 10 of substantial axial width, the lamp body being demountably supported and suspended from the open end of the lamp housing by means of resilient annular gasket 36.

It will be seen that the gasket 36 includes an annular seat 38 on its inner surface between a radially inwardly and forwardly swept annular lip 40 terminating in an annular bead 42, and a radially inwardly directed thick annular projection 44 which is axially spaced from a second projection 46 by a slot 48. As in the previous embodiment, the lamp body flange 10 is mounted in the gasket seat 38, while the projection 46 is mounted within the channel shaped seat 4 formed on the lamp housing.

Intermediate its axial length on its external surface and opposite the projection 44, the gasket 36 is provided with an annular rib 50 which separates and forms in part with the gasket body a pair of externally opening annular slots 52. In this form of the invention, two doors or clamping rings 54 and 56, respectively, engage the external surface of the gasket 36 to urge it into engagement with the mounting flange 10 and seat 4. As appears clearly in Figure 3, the doors 54 and 56, respectively, have adjacent radially inwardly extending flanges seated in the slots 52 to either side of the annular rib 50. It will be appreciated that the clamping ring 54 cooperates with the gasket 36 as the clamping ring 14 cooperates with the gasket 12 of the previously described embodiment; that is, the forwardly extending edge of the clamping ring or door 54 curves arcuately inwardly against the lip 40 of the gasket and terminates beneath the annular bead 42. As before, the doors 54 and 56 are provided with ears for receiving suitable means to clamp the doors about the gasket 36.

It will be readily apparent that in this form of the invention, the doors 54 and 56 permit individual adjustment of clamping pressure between the respective doors, gasket 36, mounting flange 10 and seat 4. Moreover, although a mechanic may inadvertently clamp one or the other of the doors 54 and 56 too tightly about the gasket 36, the thick annular resilient projection 44 will insure a resilient mounting existing for the lamp body from the lamp housing.

It may therefore be seen that the sealed beam unit or lamp body is resiliently supported within the gasket and door, or doors, which in turn suspend the unit from the lamp housing. The configuration of the resilient gasket is such that the sealed beam unit is completely isolated by the resilient gasket from any contact with either the door, or doors, and lamp housing. Accordingly, the resilient gasket not only suspends the unit from the housing, but will also absorb any shocks which would otherwise be transmitted from the vehicle through the housing to the lamp unit body. Furthermore, in the embodiment shown in Figure 3, there is less danger of the clamping pressure of the doors being adjusted too tightly in the field as to immobilize the resilient shock absorbing characteristics of the gasket 36, since the doors 54 and 56 are individually associated with the flange 10 and seat 4 to either side of the intermediate projecting mass of resilient material 44.

I claim:

1. In a lamp assembly, a housing generally open in an axial direction at one end, and annular gasket seat at the open end of the housing, including a flange, a retainer ring on the housing mounted for clamping adjustment therewith and extending opposite the flange to define the annular gasket seat, a resilient gasket having a base portion releasably clamped between the flange and the retainer ring in the gasket seat, an otherwise flexibly free short neck portion integral with and extending axially from the base portion of the resilient gasket, a peripheral lip portion on the resilient gasket integral with and extending axially beyond the neck portion and formed on its inner surface into an annular lamp seat, a lamp resiliently supported by the gasket and having an annular outstanding flange extending into the lamp seat, the lamp being otherwise free from attachment to the gasket and the housing, and a clamping ring around the lip portion of the gasket applying releasable clamping pressure between the lamp seat of the lip portion and the flange on the lamp.

2. In a lamp assembly, a housing generally open in an axial direction at one end, an annular gasket seat at the open end of the housing, a resilient gasket having a base portion, means securing said base portion in said gasket seat, an otherwise flexibly free short neck portion integral with and extending axially from the base portion of the resilient gasket, a peripheral lip portion on the resilient gasket integral with and extending axially beyond the neck portion and formed on its inner surface into an annular lamp seat, a lamp resiliently supported by the gasket and having an annular outstanding flange extending into the lamp seat, the lamp being otherwise free from attachment to the gasket and the housing, and a clamping ring around the lip portion of the gasket applying releasable clamping pressure between the lamp seat of the lip portion and the flange on the lamp.

3. In a lamp assembly, a housing having an open end, a gasket seat at the open end of the housing, a lamp unit having an annular mounting flange, an integral annular resilient gasket having a base portion grippingly engaging said seat of said housing and an annular lamp seat spaced therefrom and grippingly engaging said lamp mounting flange to support said lamp unit, and an otherwise flexibly free short neck portion of said gasket formed integral with and intermediate said base portion and said lamp seat of said gasket.

4. In a lamp assembly, a housing generally open in an axial direction at one end, a gasket seat at the open end of said housing, an annular resilient gasket having a base portion grippingly engaging said gasket seat, an otherwise flexibly free short neck portion of the gasket integral with and extending from the base portion of said gasket, an annular lip portion on the gasket integral with and extending beyond said neck portion and having an annular lamp seat on its inner surface, and a lamp unit resiliently supported by the gasket and having an annular outstanding flange grippingly received within said lamp seat of said gasket, said lamp unit being otherwise free from attachment to the gasket and the housing.

References Cited in the file of this patent

UNITED STATES PATENTS

| | | |
|---|---|---|
| 2,044,713 | Trott | June 16, 1936 |
| 2,332,362 | Bartow | Oct. 19, 1943 |
| 2,368,166 | Sheldrick et al. | Jan. 30, 1945 |
| 2,685,641 | McDowell | Aug. 3, 1954 |
| 2,686,867 | Lewellen et al. | Aug. 17, 1954 |
| 2,762,908 | Gaither | Sept. 11, 1956 |

FOREIGN PATENTS

| | | |
|---|---|---|
| 223,070 | Great Britain | Oct. 16, 1924 |
| 478,579 | Great Britain | Jan. 20, 1938 |
| 505,768 | Great Britain | May 16, 1939 |
| 151,411 | Sweden | Sept. 13, 1955 |